(12) United States Patent
Eveley

(10) Patent No.: US 6,672,604 B2
(45) Date of Patent: Jan. 6, 2004

(54) TRUCK AXLE ASSEMBLY

(76) Inventor: Nicholas Eveley, 45 Lakegate Dr., Stoney Creek, Ontario (CA), L8E 3T7

( * ) Notice: Subject to any disclaimer, the term of this patent is extended or adjusted under 35 U.S.C. 154(b) by 0 days.

(21) Appl. No.: 09/969,781

(22) Filed: Oct. 4, 2001

(65) Prior Publication Data

US 2003/0067133 A1 Apr. 10, 2003

(51) Int. Cl.[7] .................................................. B60G 3/12
(52) U.S. Cl. ........................... 280/124.128; 280/124.153
(58) Field of Search ..................... 280/124.11, 124.116, 280/124.128, 124.129, 124.13, 124.133, 124.153

(56) References Cited

U.S. PATENT DOCUMENTS

| | | | | |
|---|---|---|---|---|
| 4,371,190 A | * | 2/1983 | Vandenberg | 280/124.116 |
| 4,693,486 A | * | 9/1987 | Pierce et al. | 280/80.1 |
| 4,991,868 A | * | 2/1991 | VanDenberg | 280/86.75 |
| 5,116,075 A | * | 5/1992 | Pierce | 280/124.116 |
| 5,127,668 A | * | 7/1992 | Raidel | 280/124.116 |
| 6,241,266 B1 | * | 6/2001 | Smith et al. | 280/124.116 |

* cited by examiner

Primary Examiner—Paul N. Dickson
Assistant Examiner—Faye Fleming
(74) Attorney, Agent, or Firm—Robert F. Delbridge

(57) ABSTRACT

A truck axle assembly has a pair of transversely spaced longitudinally extending swing arms each attachable adjacent one end to a truck chassis for pivotal movement relative thereto about a transverse axis. Each swing arm has an axle mounting bracket detachably secured thereto adjacent an opposite end thereof, and each axle mounting bracket has a transverse portion extending across the swing arm and a pair of transversely spaced attachment portions extending from the transverse portion on opposite sides of the swing arm and detachable secured thereto. An axle extends transversely across the swing arms adjacent the opposite ends thereof and detachably secured to the mounting brackets. Each axle mounting bracket also supports a brake actuating member for a brake mechanism mounted on an adjacent end of the axle.

1 Claim, 3 Drawing Sheets

US 6,672,604 B2

TRUCK AXLE ASSEMBLY

This invention relates to truck axle assemblies. In this application, the term "truck" includes trailers.

FIELD OF THE INVENTION

This invention relates to truck axle assemblies. In this application, the term "truck" includes trailers.

BACKGROUND OF THE INVENTION

It is known to provide a truck axle assembly with a pair of transversely spaced longitudinally extending swinging arms which are attachable adjacent to one end of a truck chassis for pivotal movement relative thereto about a transverse axis, with an axle extending transversely across the swing arms adjacent opposite ends thereof and secured thereto. However, truck axle assemblies of this kind have been found to be somewhat difficult and/or expensive to repair.

It is therefore an object of the invention to provide a truck axle assembly of this kind which is less difficult and/or expensive to repair.

SUMMARY OF INVENTION

According to the invention, each swing arm has an axle mounting bracket detachably secured thereto about an opposite end thereof, each axle mounting bracket having a transverse portion extending across the swing arm and a pair of transversely spaced attachment portions extending from the transverse portion on opposite sides of the swing arm and detachably secured thereto, the axle being detachably secured to the mounting brackets, and each mounting bracket also supporting a brake actuating member for a brake mechanism mounted on an adjacent end of the axle.

This arrangement enables the swing arms to be more detached from the remainder of the assembly than is the case with known truck axle assemblies.

The attachment portions of each axle mounting bracket may be detachably secured by bolts which each extend through the attachment portions and the swing arm.

The axle may be detachably secured to each mounting bracket by U-bolts which pass around the axle and are detachably secured to projecting parts of the transverse portion of the bracket which extend transversely beyond the attachment portion.

The transverse portion of each attachment bracket may extend across the bottom of the associated swing arm. Alternatively, each transverse portion may extend across the top of the associated swing arm.

DESCRIPTION OF THE DRAWINGS

One embodiment of the invention will now be described, by way of example, with reference to the accompanying drawings, of which.

DESCRIPTION OF PREFERRED EMBODIMENTS

Figure 1:
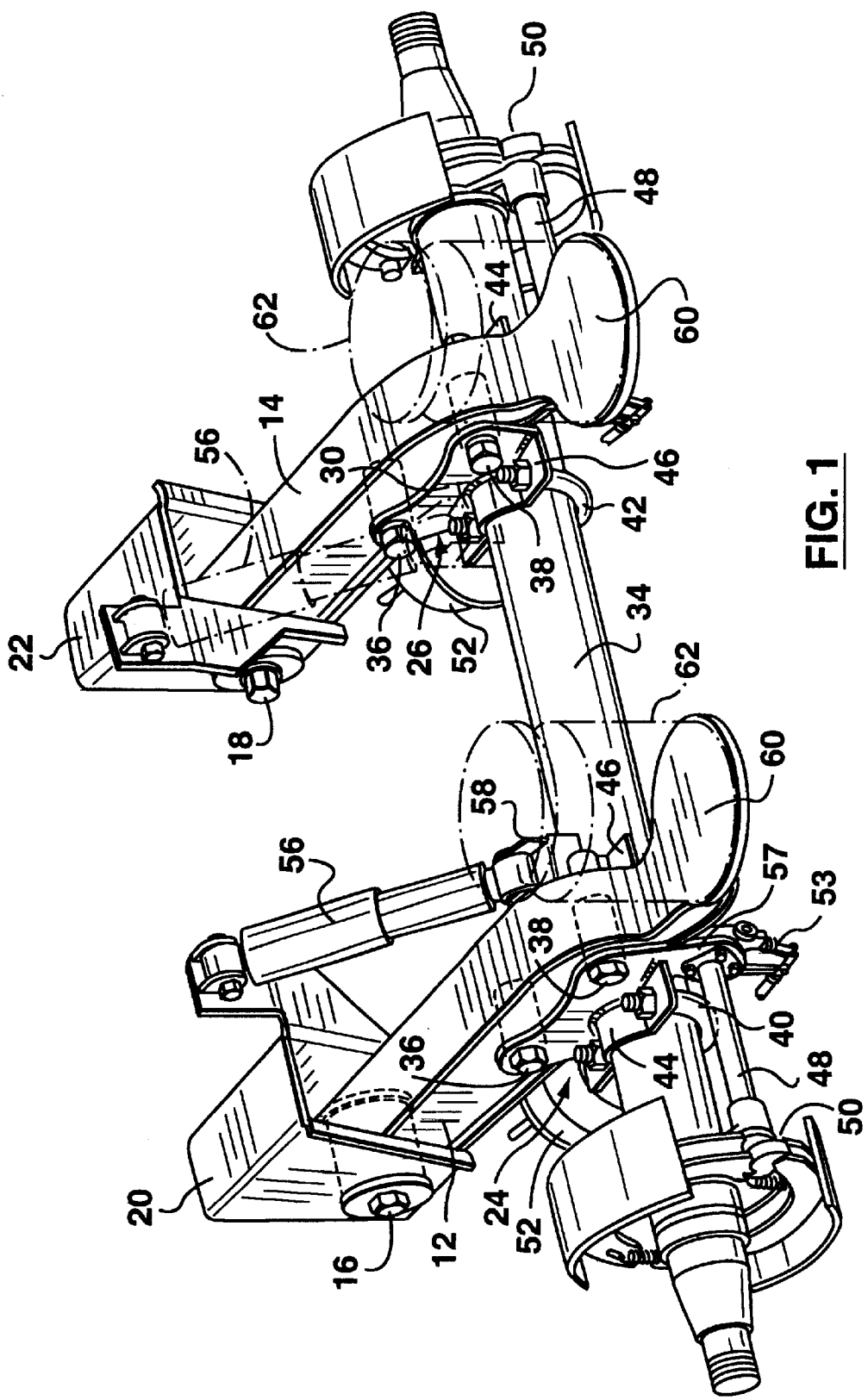
FIG. 1 is a perspective view of a truck axle assembly in accordance with one embodiment of the invention.
Figure 2:
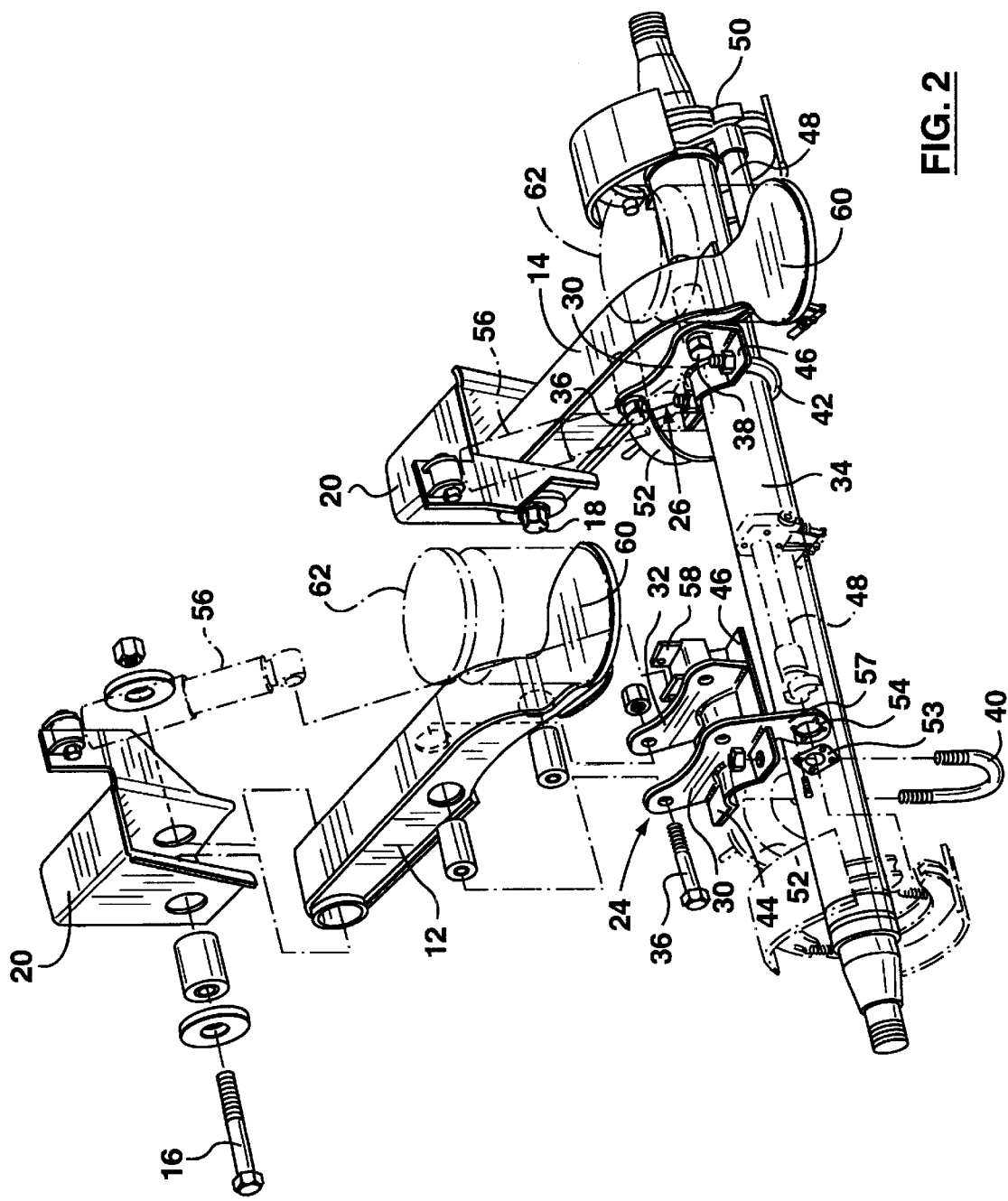
FIG. 2 is a partially exploded view of the truck axle assembly of FIG. 1 showing certain parts more clearly.
Figure 3:
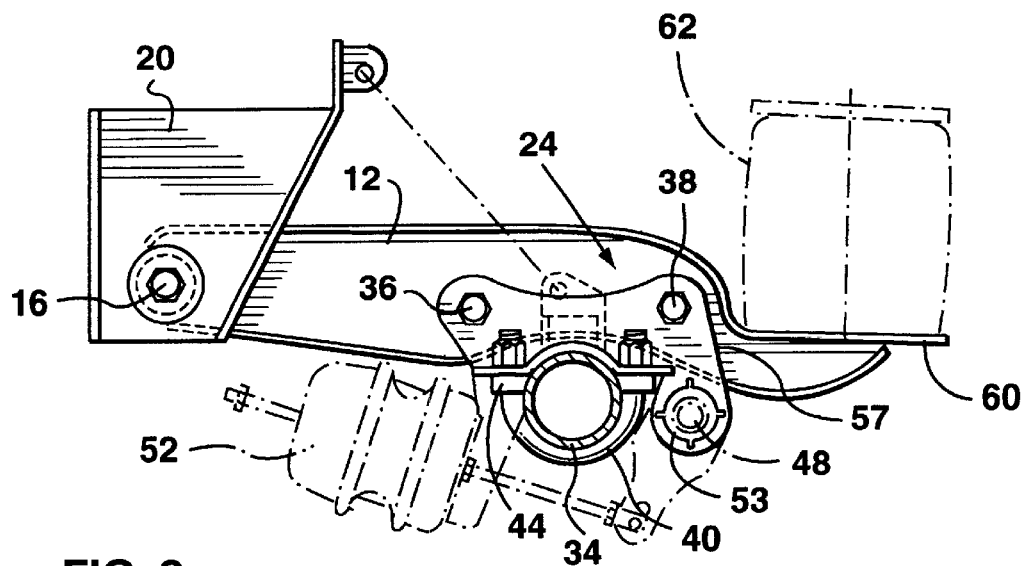
FIG. 3 is a side view of the truck axle assembly.
Figure 4:
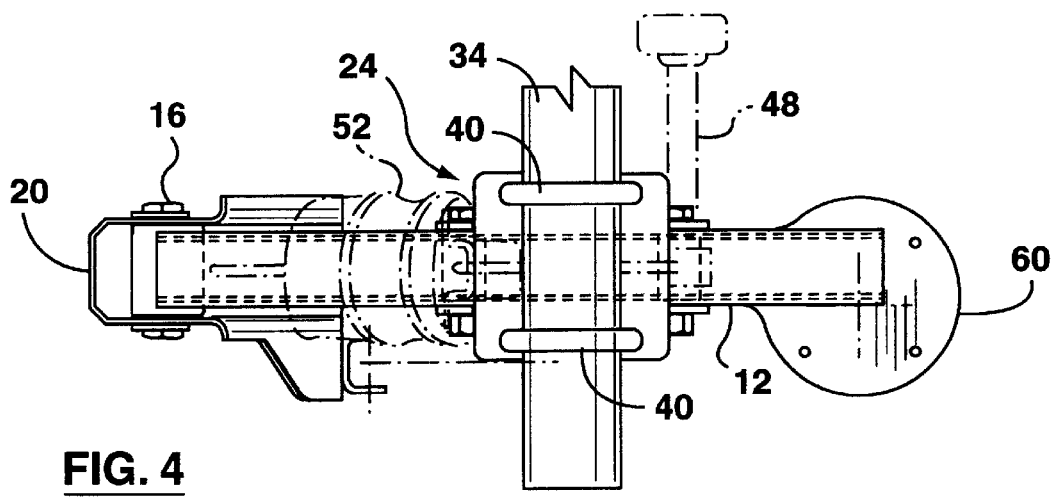
FIG. 4 is a bottom view thereof.
Figure 5:
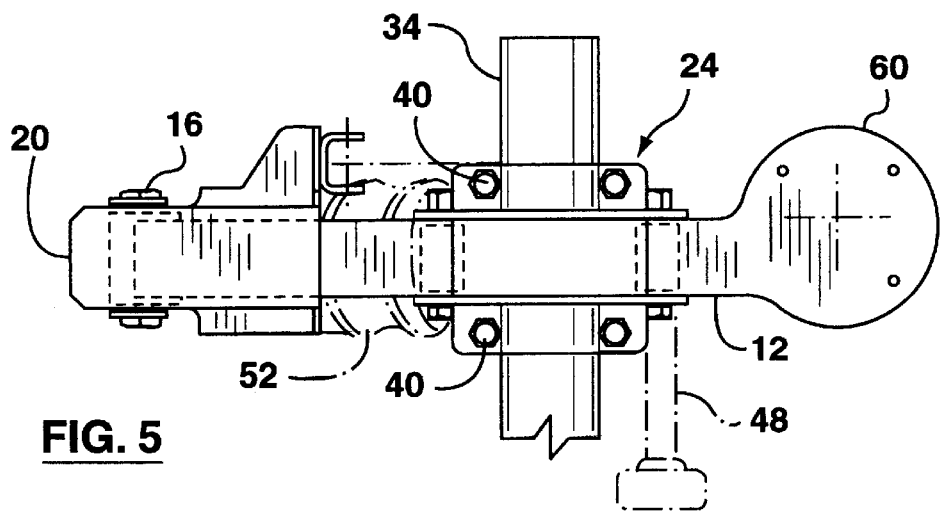
FIG. 5 is a top view thereof.

Referring to the drawings, a truck axle assembly has a pair of transversely spaced longitudinally extending swing arms 12, 14 attachable adjacent one end thereof by bolts 16, 18 to arm mountings 20, 22 carried by a truck chassis (not shown) for pivotal movement relative thereto about a transverse axle.

Each swing arm 12, 14 has an axle mounting bracket 24, 26 respectively adjacent an opposite end thereof. Each axle mounting bracket 24, 26 has a transverse portion 28 extending across the bottom of the spring arm 12 or 14 and a pair of transversely spaced attachment members 30, 32 on opposite sides of the swing arm 24 or 26 and detachably secured thereto. An axle 34 extends transversely across the swing arms 12, 14 and is detachably secured thereto.

Attachment portions 30, 32 of each axle mounting bracket 24, 26 are detachably secured to respective swing arm 12 or 14 by bolts 36, 38 which extend through the attachment portions 30, 32 and the respective swing arm 12 or 14. The axle 34 is detachably secured to each mounting bracket 24, 26 by U-bolts 40, 42 which pass around axle 34 and are detachably secured to projecting parts 44, 46 of the transverse portions 28 of the brackets 24 or 26 which extend transversely beyond the attachment portion 30, 32. The outer casing of the axle 34 is preferably secured to the bracket 24, 26 by welds which are removable when desired.

Each mounting bracket 24, 26 also supports a transversely extending actuating rod 48 for actuating a brake mechanism 50 mounted on an adjacent end of the axle 34, the actuating rod 48 being controlled by means of a brake actuator 52 in known manner. The actuating rod 48 passes through a bushing 53 mounted in an aperture 54 in a downwardly projecting portion 56 at the rear end of the attachment portion 30. The actuating rod 48 may for example be a conventional rotatable cam rod.

A conventional hydraulic shock absorber 56 is connected between each arm mounting 20, 22 and an absorber mounting 58 carried by the laterally inner part 46 of the transverse portion 28 of the respective axle mounting bracket 24 or 26.

The rear end of each spring arm 20, 22 has a horizontal disk-shaped portion 60 which supports a conventional air spring 62 whose upper end is securable to the truck chassis.

In an alternative embodiment (not shown), the axle mounting brackets are positioned on top of the swing arms with the transverse portions extending across the top of the respective swing arm and with the axle being mounted above the mounting brackets and the swing arms instead of below as in the embodiment described above.

It will now be readily apparent to a person skilled in the art from the above description of preferred embodiments that a truck axle assembly in accordance with the present invention can readily be taken apart and repaired when necessary. Other embodiments of the invention will also now be readily apparent, the scope of the invention being defined in the appended claims.

What is claimed is:

1. A truck axle assembly including:

a pair of transversely spaced longitudinally extending swing arms each attachable adjacent one end to a truck chassis for pivotal movement relative thereto about a transverse axis, each swing arm having an axle mounting bracket detachably secured thereto adjacent an opposite end thereof, each axle mounting bracket having a transverse portion extending across the swing arm and a pair of transversely spaced attachment portions extending from the transverse portion on opposite sides of the swing arm and detachably secured thereto, the attachment portions of each axle mounting bracket being detachably secured to the swing arm by bolts which extend through the attachment portions and the swing arm, an axle extending transversely across the swing arms adjacent the opposite ends thereof in engagement with the transverse portions of the mounting brackets and being detachably secured to the mounting brackets, each axle mounting bracket also supporting a brake actuating member for a brake mechanism mounted on an adjacent end of the axle, and each axle being detachably secured to each mounting bracket by U-bolts which pass around the axle and are detachably secured to projecting parts of the transverse portion of the bracket which extend transversely beyond the attachment portions.

* * * * *